(12) United States Patent
Enomoto

(10) Patent No.: US 6,833,963 B2
(45) Date of Patent: Dec. 21, 2004

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/455,307

(22) Filed: Jun. 6, 2003

(65) Prior Publication Data
US 2003/0231405 A1 Dec. 18, 2003

(30) Foreign Application Priority Data
Jun. 17, 2002 (JP) ........................................ 2002-175394

(51) Int. Cl.$^7$ ............................................. G02B 15/14
(52) U.S. Cl. ....................................... 359/686; 359/683
(58) Field of Search ................................. 359/686, 683, 359/685, 676, 745–747

(56) References Cited

U.S. PATENT DOCUMENTS

| 5,105,311 A | * | 4/1992 | Tokumaru et al. | .......... 359/686 |
| 6,369,955 B1 | | 4/2002 | Enomoto et al. | ........... 359/685 |
| 6,437,922 B2 | | 8/2002 | Enomoto et al. | ........... 359/685 |
| 6,449,433 B2 | * | 9/2002 | Hagimori et al. | ............. 396/72 |
| 6,661,584 B2 | * | 12/2003 | Nishimura | .................. 359/686 |
| 2003/0026003 A1 | * | 2/2003 | Eguchi et al. | .............. 359/686 |

FOREIGN PATENT DOCUMENTS

JP 2002350728 12/2002

* cited by examiner

Primary Examiner—Jordan M. Schwartz
(74) Attorney, Agent, or Firm—Greenblum & Bernstein, P.L.C.

(57) ABSTRACT

A zoom lens system includes a positive first lens group, a negative second lens group, a positive third lens group, and a negative fourth lens group, in this order from the object. Zooming is performed by moving the positive first through negative fourth lens groups along the optical axis.

The zoom lens system satisfies the following condition:

$$-12 < f_T/f_{4G} < -10.5 \qquad (1)$$

wherein $f_T$ designates the focal length of the entire zoom lens system at the long focal length extremity; and $f_{4G}$ designates the focal length of the negative fourth lens group.

11 Claims, 10 Drawing Sheets

Fig. 1
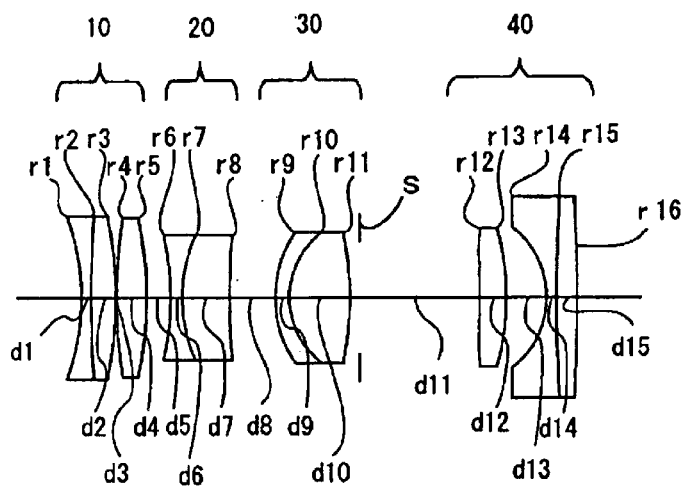
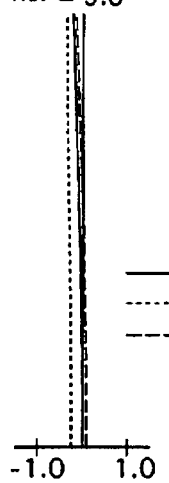
Fig. 2A
FNO. = 5.8
-1.0  1.0
SPHERICAL
ABERRATION
CHROMATIC
ABERRATION
— d Line
······ g Line
---- C Line
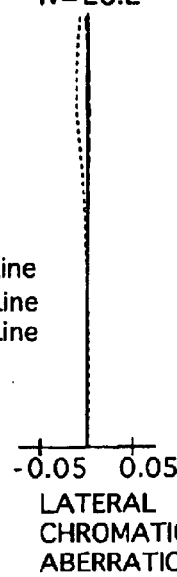
Fig. 2B
W = 28.2°
-0.05  0.05
LATERAL
CHROMATIC
ABERRATION
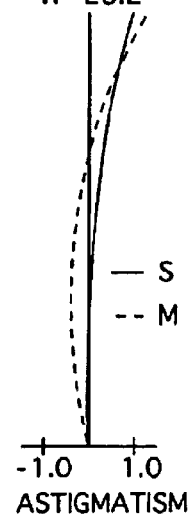
Fig. 2C
W = 28.2°
-1.0  1.0
ASTIGMATISM
— S
-- M
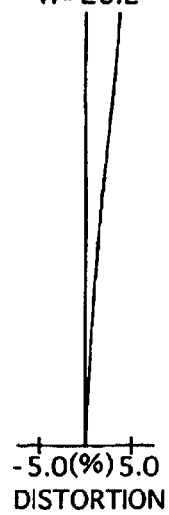
Fig. 2D
W = 28.2°
-5.0(%) 5.0
DISTORTION

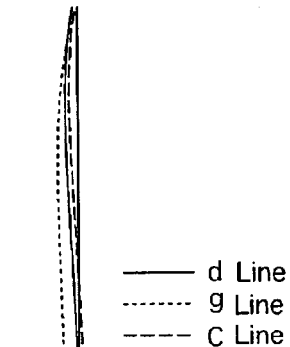 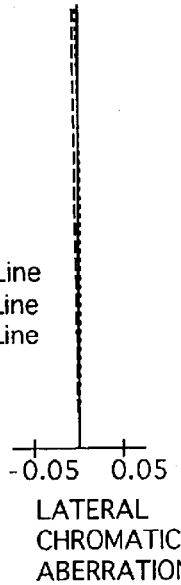 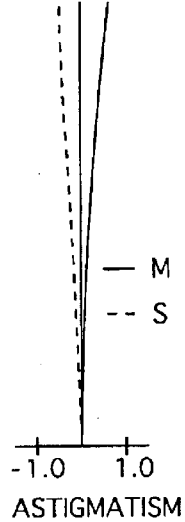 
Fig. 3A  Fig. 3B  Fig. 3C  Fig. 3D
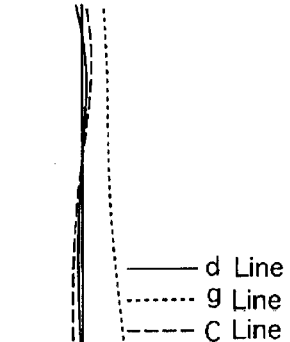 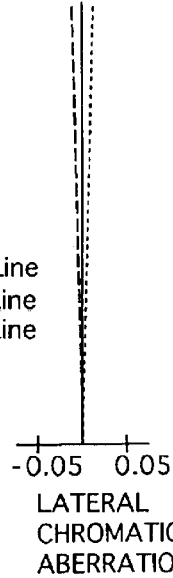 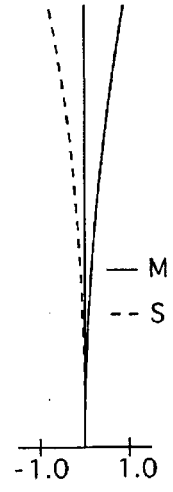 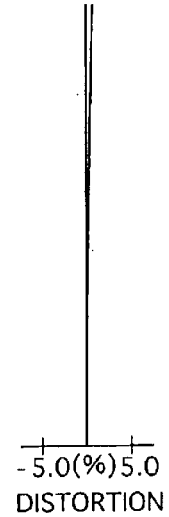
Fig. 4A  Fig. 4B  Fig. 4C  Fig. 4D

Fig. 5
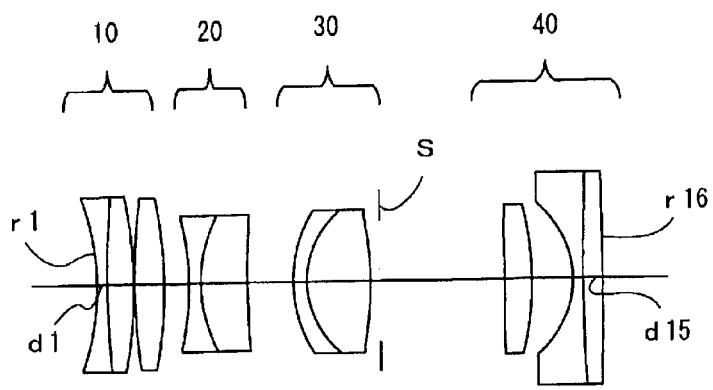
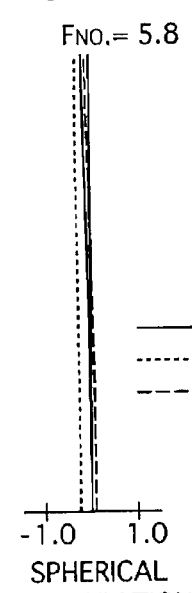
Fig. 6A
FNO.= 5.8
—— d Line
········ g Line
---- C Line
-1.0   1.0
SPHERICAL
ABERRATION
CHROMATIC
ABERRATION
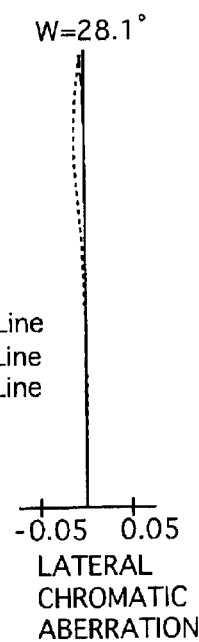
Fig. 6B
W=28.1°
-0.05  0.05
LATERAL
CHROMATIC
ABERRATION
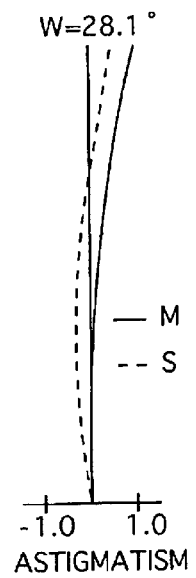
Fig. 6C
W=28.1°
—— M
-- S
-1.0   1.0
ASTIGMATISM
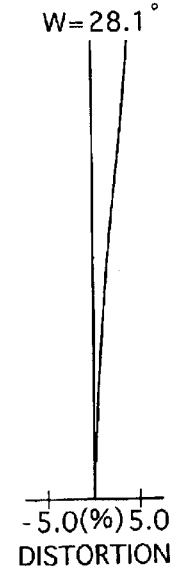
Fig. 6D
W=28.1°
-5.0(%)5.0
DISTORTION

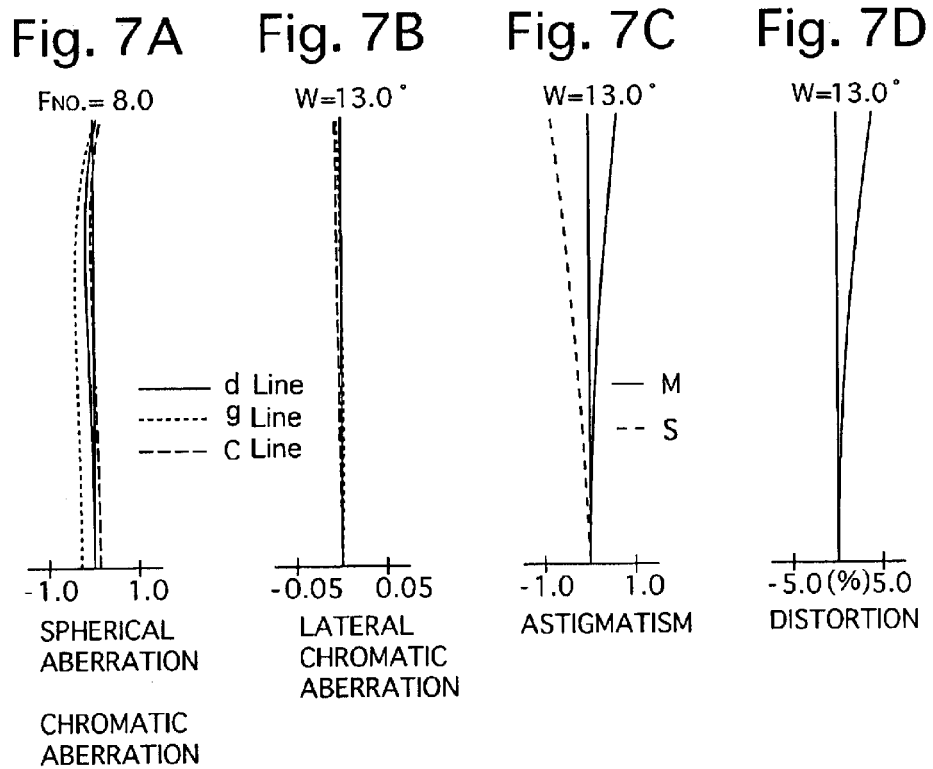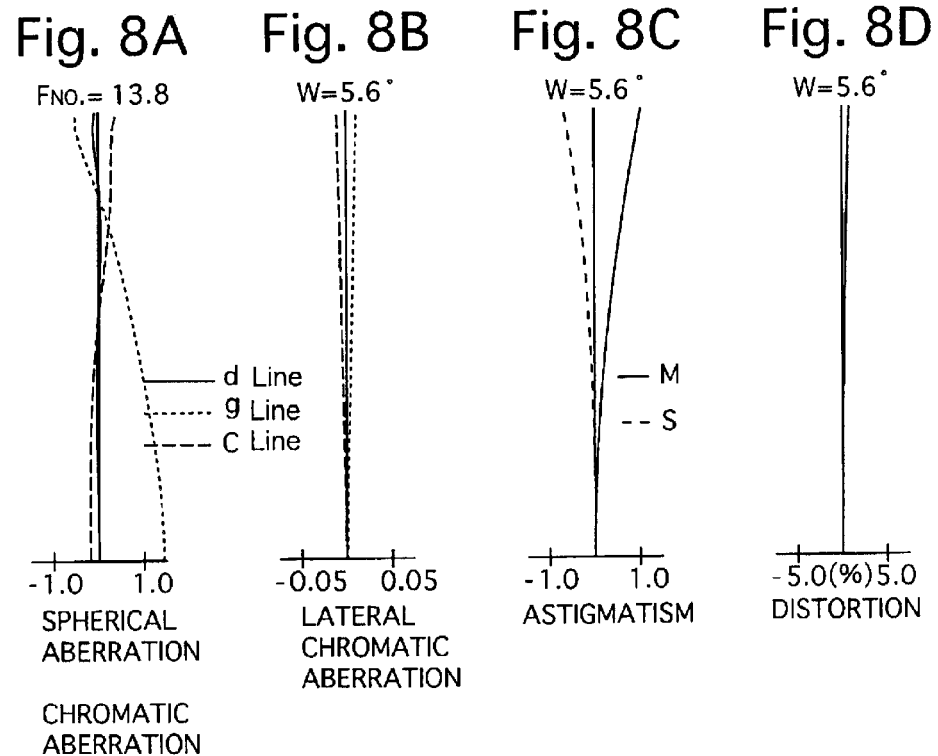

Fig. 9
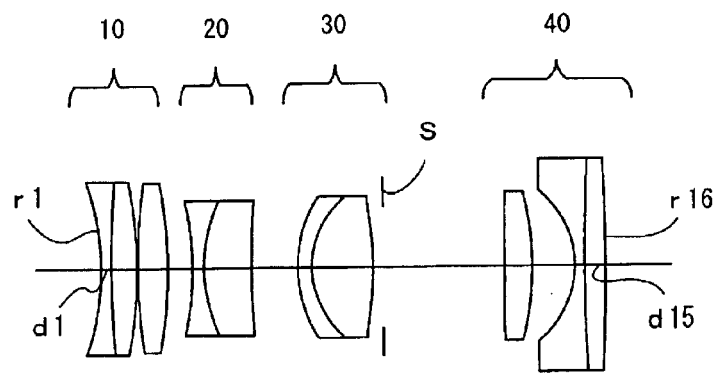
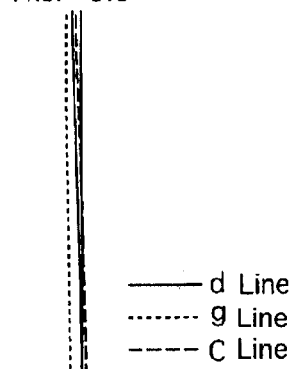
Fig.10A
F<sub>NO.</sub>= 5.8
— d Line
······· g Line
---- C Line
-1.0  1.0
SPHERICAL
ABERRATION
CHROMATIC
ABERRATION
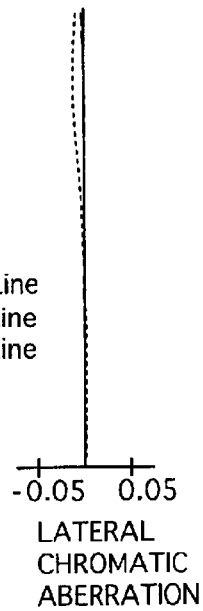
Fig.10B
W=28.2°
-0.05  0.05
LATERAL
CHROMATIC
ABERRATION
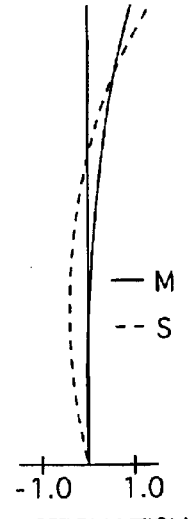
Fig.10C
W=28.2°
— M
-- S
-1.0  1.0
ASTIGMATISM
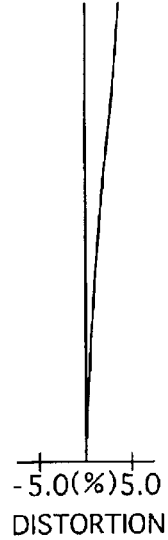
Fig.10D
W=28.2°
-5.0(%)5.0
DISTORTION

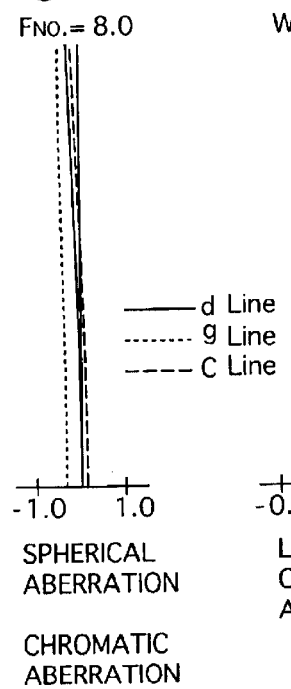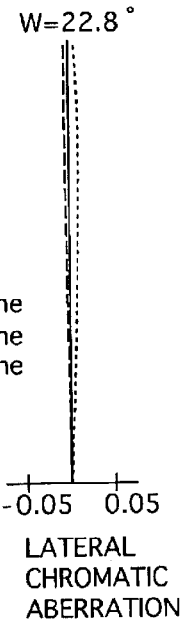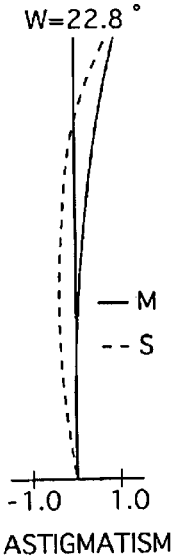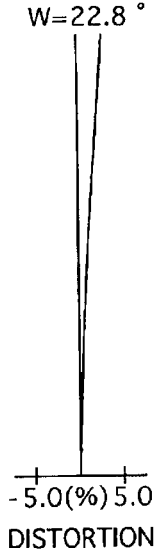
Fig.11A  Fig.11B  Fig.11C  Fig.11D
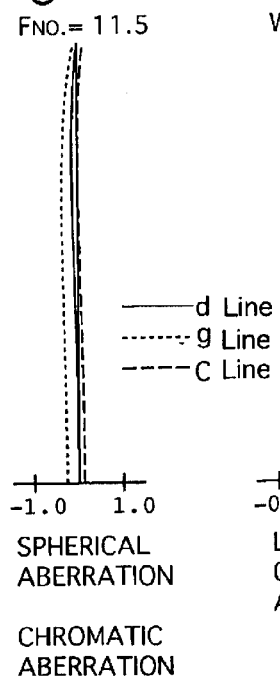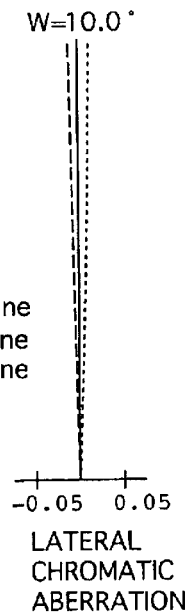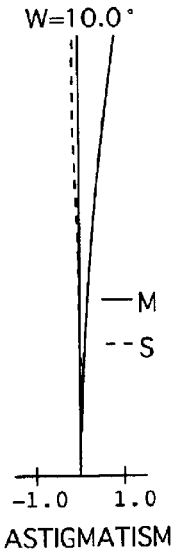
Fig.12A  Fig.12B  Fig.12C  Fig.12D

F$_{NO.}$= 13.8   W=5.7°   W=5.7°   W=5.7°

— d Line
······ g Line
--- C Line

— M
--- S

-1.0  1.0        -0.05  0.05    -1.0  1.0      -5.0(%)5.0
SPHERICAL        LATERAL         ASTIGMATISM    DISTORTION
ABERRATION       CHROMATIC
                 ABERRATION
CHROMATIC
ABERRATION

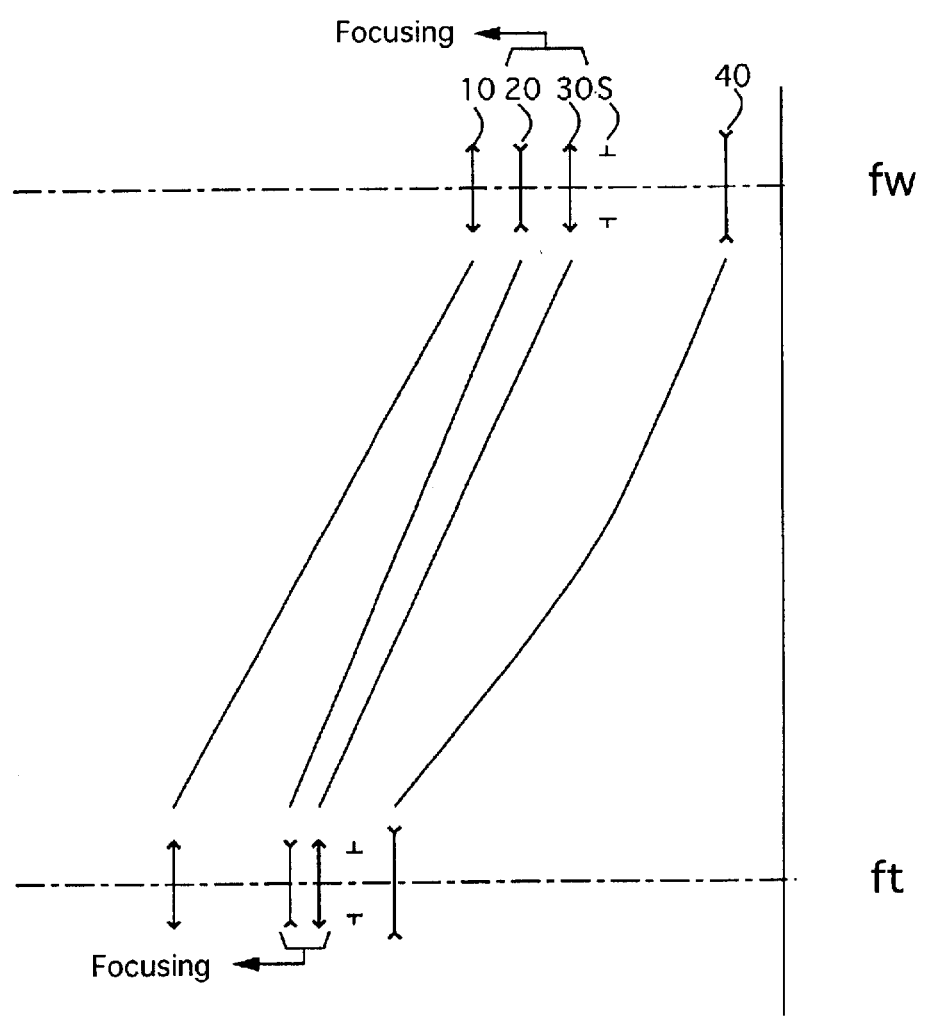

ZOOM LENS SYSTEM

BACKGROUND OF THE INVENTION

1. Field of the Invention

The present invention relates to a zoom lens system of a four-lens-group arrangement for a compact camera, and in particular, relates to increasing the zoom ratio thereof.

2. Description of the Prior Art

Unlike a zoom lens system of a single lens reflex (SLR) camera which requires space to accommodate a quick-return mirror behind the photographing lens system, a zoom lens system of a compact camera does not require a long back focal distance. Therefore a compact camera generally employs a telephoto-type zoom lens system having a positive front lens group and a negative rear lens group in this order from the object, while a SLR camera employs a retrofocus-type zoom lens system having a negative front lens group and a positive rear lens group in this order from the object.

In such a telephoto-type zoom lens system for a compact camera, a zoom ratio of about 3 can be attained by a zoom lens system of a two or three-lens-group arrangement. However, if the zoom ratio is increased up to 4 or 5, even a zoom lens system of a three-lens-group arrangement has to increase the traveling distance thereof, and the size of the zoom lens system becomes larger.

Furthermore, in such a zoom lens system of a three-lens-group arrangement, if an attempt is made to reduce the traveling distance thereof by making the power of each lens group stronger, the number of lens elements are inevitably increased in order to correct aberrations which occur in each lens group. Consequently, the thickness of each lens group is increased, and therefore the overall length of the zoom lens system is increased. Moreover, the overall length of the zoom lens system at the retracted position undesirably increases the thickness of the camera body.

SUMMARY OF THE INVENTION

The zoom lens system according to the present invention employs a four-lens-group arrangement which is an improvement of a three-lens-group arrangement. More specifically, the zoom lens system includes a positive lens group, a negative lens group, a positive lens group, and a negative lens group in this order from the object so that a zoom ratio of 5 or more can be attained.

According to an aspect of the present invention, there is provided a zoom lens system including a positive first lens group, a negative second lens group, a positive third lens group, and a negative fourth lens group, in this order from the object. Zooming is performed by moving the positive first through negative fourth lens groups along the optical axis.

The zoom lens system satisfies the following condition:

$$-12 < f_T/f_{4G} < -10.5 \tag{1}$$

wherein $f_T$ designates the focal length of the entire zoom lens system at the long focal length extremity; and $f_{4G}$ designates the focal length of the negative fourth lens group.

The zoom lens system preferably satisfies the following condition:

$$1.1 < f_{T23}/f_{W23} < 1.4 \tag{2}$$

wherein $f_{T23}$ designates the combined focal length of the negative second lens group and the positive third lens group at the long focal length extremity; and $f_{W23}$ designates the combined focal length of the negative second lens group and the positive third lens group at the short focal length extremity.

The zoom lens system can satisfy the following condition:

$$0.05 < (d_{W12} - d_{T12})/f_W < 0.15 \tag{3}$$

wherein $d_{W12}$ designates the distance between the positive first lens group and the negative second lens group at the short focal length extremity;

$d_{T12}$ designates the distance between the positive first lens group and the negative second lens group at the long focal length extremity; and $f_W$ designates the focal length of the entire zoom lens system at the short focal length extremity.

The zoom lens system preferably satisfies the following condition:

$$2.5 < f_T/f_{1G} < 3.5 \tag{4}$$

wherein $f_{1G}$ designates the focal length of the positive first lens group.

The negative fourth lens group preferably includes cemented lens elements which satisfy the following conditions:

$$2 < f_T/f_{c4G} < 4 \tag{5}$$

$$15 < v_{4P} - v_{4N} \tag{6}$$

wherein $f_{c4G} = r_{c4G}/(n_{4P} - n_{4N})$;

$r_{c4G}$ designates the radius of curvature of the bonding surface of the cemented lens elements in the negative fourth lens group;

$n_{4P}$ designates the refractive index of a positive lens element of the cemented lens elements;

$n_{4N}$ designates the refractive index of a negative lens element of the cemented lens elements;

$v_{4P}$ designates the Abbe number of the positive lens element of the cemented lens elements; and $v_{4N}$ designates the Abbe number of the negative lens element of the cemented lens elements.

The positive first lens group preferably includes cemented lens elements which satisfy the following conditions:

$$0.2 < f_T/f_{c1G} < 0.4 \tag{7}$$

$$5 < v_{1P} - v_{1N} \tag{8}$$

wherein $f_{c1G} = r_{c1G}/(n_{1P} - n_{1N})$;

$r_{c1G}$ designates the radius of curvature of the bonding surface of the cemented lens elements in the positive first lens group;

$n_{1P}$ designates the refractive index of a positive lens element of the cemented lens elements;

$n_{1N}$ designates the refractive index of a negative lens element of the cemented lens elements;

$v_{1P}$ designates the Abbe number of the positive lens element of the cemented lens elements; and $\nu_{1N}$ designates the Abbe number of the negative lens element of the cemented lens elements.

The zoom lens system can satisfy the following condition:

$$5.2 < f_T/f_W \qquad (9)$$

The positive third lens group preferably includes a lens element having at least one aspherical surface which satisfies the following condition:

$$-30 < \Delta I_{ASP} < -10 \qquad (10)$$

wherein $\Delta I_{ASP}$ designates the amount of change of the spherical aberration coefficient due to the aspherical surface in the positive third lens group under the condition that the focal length at the short focal length extremity is normalized to 1.0.

The negative fourth lens group preferably includes a lens element having at least one aspherical surface which satisfies the following condition:

$$0 < \Delta V_{ASP} < 0.6 \qquad (11)$$

wherein $\Delta V_{ASP}$ designates the amount of change of the distortion coefficient due to the aspherical surface in the negative fourth lens group under the condition that the focal length at the short focal length extremity is normalized to 1.0.

The present disclosure relates to subject matter contained in Japanese Patent Application No. 2002-175394 (filed on Jun. 17, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement, at the short focal length extremity, of the zoom lens system according to a first embodiment of the present invention;

FIGS. 2A, 2B, 2C and 2D show aberrations occurred in the lens arrangement shown in FIG. 1;

FIGS. 3A, 3B, 3C and 3D show aberrations occurred in the zoom lens system of the first embodiment at an intermediate focal length;

FIGS. 4A, 4B, 4C and 4D show aberrations occurred in the zoom lens system of the first embodiment at the long focal length extremity;

FIG. 5 is a lens arrangement, at the short focal length extremity, of the zoom lens system according to a second embodiment of the present invention;

FIGS. 6A, 6B, 6C and 6D show aberrations occurred in the lens arrangement shown in FIG. 5;

FIGS. 7A, 7B, 7C and 7D show aberrations occurred in the zoom lens system of the second embodiment at an intermediate focal length;

FIGS. 8A, 8B, 8C and 8D show aberrations occurred in the zoom lens system of the second embodiment at the long focal length extremity;

FIG. 9 is a lens arrangement, at the short focal length extremity, of the zoom lens system according to a third embodiment of the present invention;

FIGS. 10A, 10B, 10C and 10D show aberrations occurred in the lens arrangement shown in FIG. 9;

FIGS. 11A, 11B, 11C and 11D show aberrations occurred in the zoom lens system of the third embodiment at a first intermediate focal length (before switching);

FIGS. 12A, 12B, 12C and 12D show aberrations occurred in the zoom lens system of the third embodiment at a second intermediate focal length (after switching);

FIG. 17 is the schematic view of the lens-group moving paths for the zoom lens system according to the first and second embodiments of the present invention.

DESCRIPTION OF THE PREFERRED EMBODIMENTS

Figure 15:
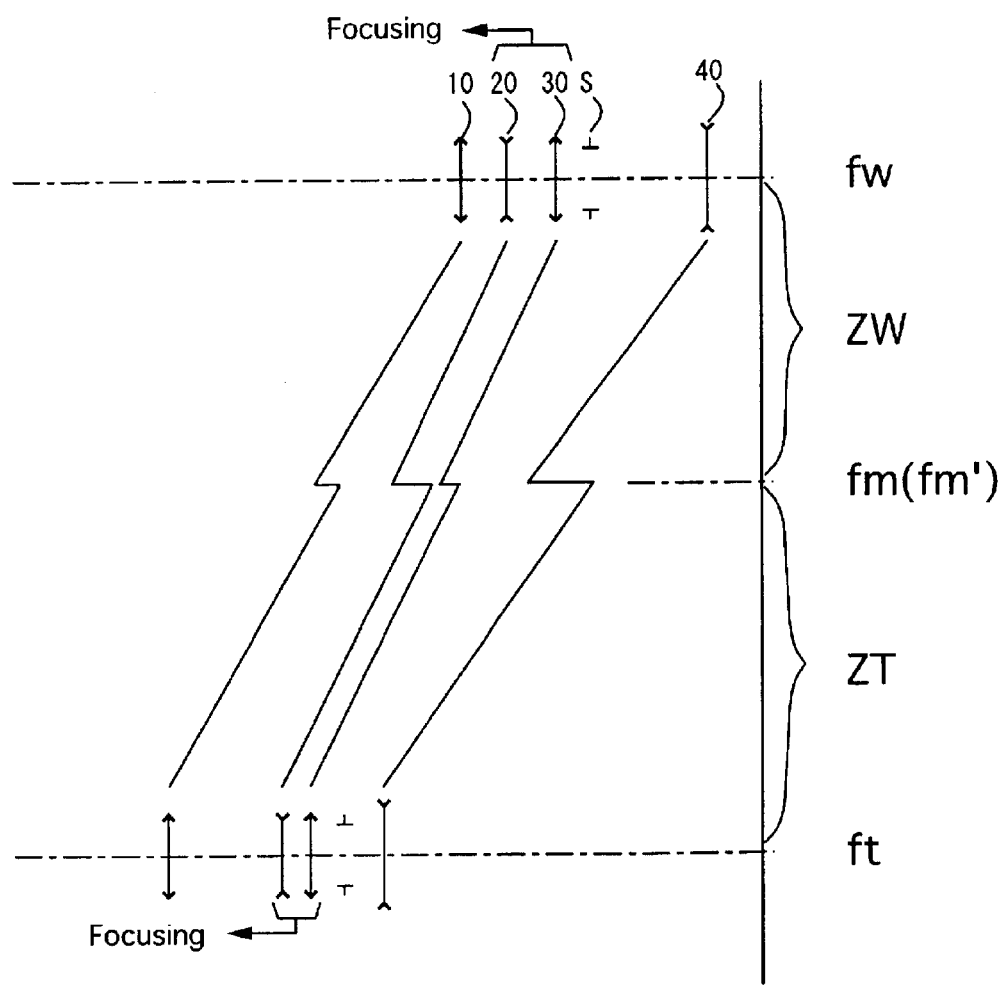
FIG. 15 is the schematic view of the lens-group moving paths for the zoom lens system according to the third embodiment of the present invention.
Figure 16:
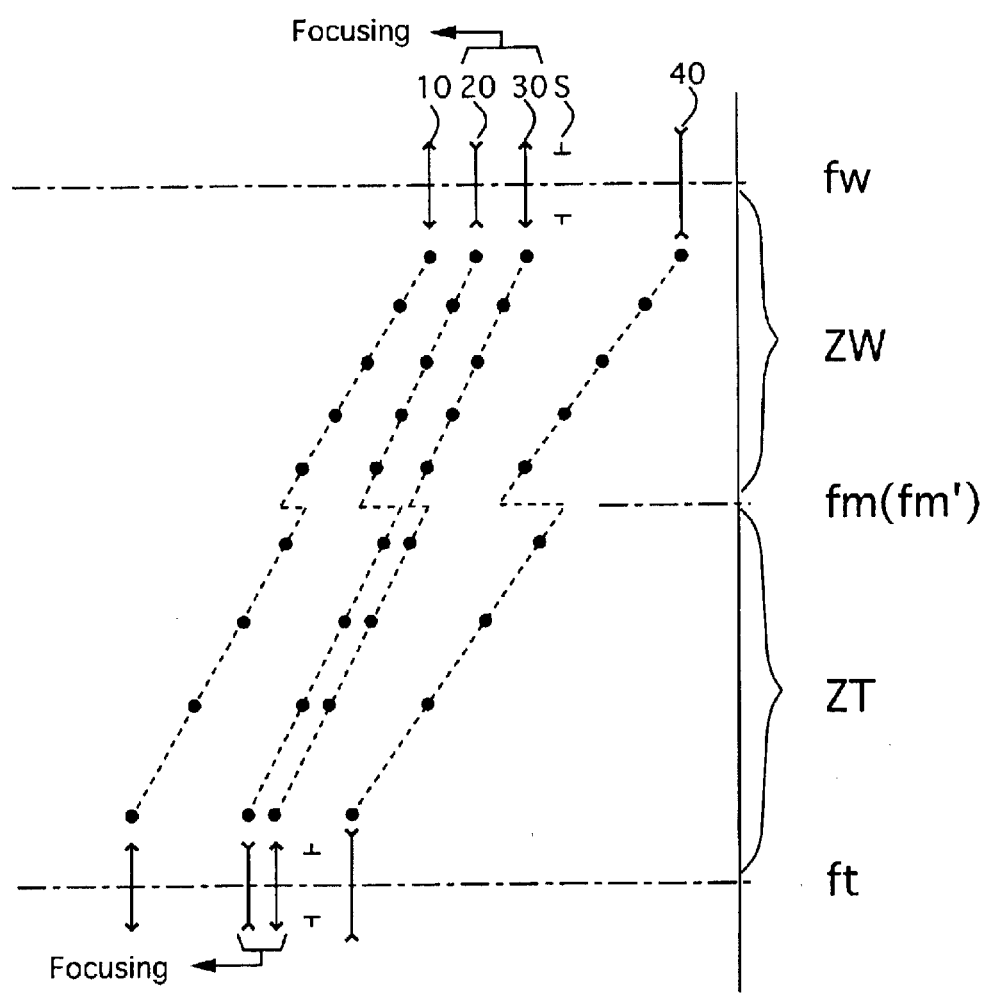
FIG. 16 is another schematic view of the lens-group moving paths for the zoom lens system according to the third embodiment of the present invention.

As shown in the lens-group moving paths of FIGS. 15 through 17, the four-lens-group zoom lens system for a compact camera includes a positive first lens group 10, a negative second lens group 20, a positive third lens group 30, and a negative fourth lens group 40, in this order from the object; and zooming is performed by moving the first through fourth lens groups in the optical axis direction.

Among the schematic views of the lens-group moving paths of FIGS. 15 through 17, FIG. 15 is an example of the lens-group moving paths having a switching movement of the lens groups at the intermediate focal lengths. According to FIG. 15, zooming from the short focal length extremity fw toward the long focal length extremity ft, the lens groups 10 through 40 are arranged to move as follows:

In a focal-length range ZW (the first focal length range; the short-focal-length side zooming range) from the short focal length extremity fW to the first intermediate focal length fm, the positive first lens group 10, the negative second lens group 20, the positive third lens group 30, and the negative fourth lens group 40 are moved toward the object.

At the first intermediate focal length fm (before switching), the positive first lens group 10, the negative second lens group 20, the positive third lens group 30, and the negative fourth lens group 40 are moved towards the image plane by a predetermined distance, so that the first intermediate focal length fm is changed to the second intermediate focal length fm' (after switching).

In a focal-length range ZT (the second focal length range; the long-focal-length side zooming range) from the second intermediate focal length fm' to the long focal length extremity ft, the positive first lens group 10, the negative second lens group 20, the positive third lens group 30, and the negative fourth lens group 40 are moved towards the object.

In the focal-length range ZW, the negative second lens group 20 and the positive third lens group 30 maintains a predetermined distance (the first state).

At the first intermediate focal length fm, the distance between the negative second lens group 20 and the positive third lens group 30 is reduced.

In the focal-length range ZT, the negative second lens group 20 and the positive third lens group 30 maintain the reduced distance (the second state).

The first intermediate focal length fm belongs to the first focal length range ZW.

The second intermediate focal length fm' is determined after the following movement of the lens groups is completed:
  (i) the positive first lens group 10 and the negative fourth lens group 40 are moved from the positions thereof, corresponding to the first intermediate focal length fm, toward the image; and
  (ii) the negative second lens group 20 and the positive third lens group 30 reduce the distance therebetween, while the negative second lens group 20 and the positive third lens group 30 are respectively moved toward the image.

Upon zooming, an aperture stop S moves together with the positive second lens group 20.

The lens-group-moving paths, before and after the switching movement, for the first through fourth lens groups shown in FIG. 15 are simply depicted as straight lines. It should however be noted that actual lens-group-moving paths are not necessarily straight lines. Furthermore, focusing is performed by integrally moving the the negative second lens group 20 and the positive third lens group 30 regardless of the focal length ranges.

The lens-group-moving paths have discontinuities at the first intermediate focal length fm and the second intermediate focal length fm'; however, by adequately determining the positions of the positive first lens group 10, the negative second lens group 20, the positive third lens group 30, and the negative fourth lens group 40 respectively at the short focal length extremity fw, the first intermediate focal length fm, the second intermediate focal length fm' and the long focal length extremity ft, solutions by which an image is correctly formed on a predetermined plane can be obtained. According to the lens-group-moving paths with these solutions, a zoom lens system which is miniaturized and has a high zoom ratio can be obtained.

FIG. 16 shows that positions for stopping each lens group are determined in a stepwise manner along the lens-group-moving paths of FIG. 15; and positions at which each lens group is to be stopped are indicated with black dots, and the dots are connected by smooth curved lines. In an actual mechanical structure, each lens group can be moved along such smooth curved lines.

FIG. 17 shows an example of the lens-group moving paths which have no intermediate-switching focal lengths. Upon zooming from the short focal length extremity toward the long focal length extremity, all the lens groups move toward the object, while the distances therebetween are varied. The aperture stop S is provided between the positive third lens group 30 and the negative fourth lens group 40, and moves together with the positive third lens group 30.

Condition (1) specifies the focal length of the negative fourth lens group 40 under the following conditions: (i) the zoom lens system has the four-lens-group arrangement, i.e., the positive lens group, the negative lens group, the positive lens group and the negative lens group, in this order from the object; and (ii) the zoom lens system has lens-group moving paths (zooming basic traces), such as the ones explained above. By satisfying condition (1), the traveling distance of the negative fourth lens group 40 can be reduced, and miniaturization of the zoom lens system can be attained.

If $f_T/f_{4G}$ exceeds the upper limit of condition (1), the power of the negative fourth lens group 40 becomes weaker, so that the traveling distance thereof becomes longer. Consequently, miniaturization of the zoom lens system cannot be attained.

If $f_T/f_{4G}$ exceeds the lower limit of condition (1), the power of the negative fourth lens group 40 becomes too strong, so that aberrations occurred therein become larger. As a result, the correcting of aberrations becomes difficult.

Condition (2) specifies the combined focal length of the negative second lens group 20 and the positive third lens group 30. By satisfying condition (2), a large zoom ratio can be obtained.

If $f_{T23}/f_{W23}$ exceeds the upper limit of condition (2), the zooming effects of the negative second lens group 20 and positive third lens group 30 increase, so that the power of each lens group becomes too strong. Consequently, aberrations in these lens groups become larger, so that the correcting of aberrations becomes difficult.

If $f_{T23}/f_{W23}$ exceeds the lower limit of condition (2), the zooming effects of the negative second lens group 20 and positive third lens group 30 cannot be obtained.

Condition (3) specifies the traveling distances of the negative second lens group 20 and the positive third lens group 30 upon zooming. By satisfying condition (3), a higher zoom ratio can be achieved while an increase of the overall length of the zoom lens system can be avoided.

If $(d_{W12}-d_{T12})/f_W$ exceeds the upper limit of condition (3), the traveling distances of the negative second lens group 20 and the positive third lens group 30 upon zooming become too long, so that the overall length of the zoom lens system increases.

If $(d_{W12}-d_{T12})/f_W$ exceeds the lower limit of condition (3), the traveling distances of the negative second lens group 20 and the positive third lens group 30 upon zooming become shorter, so that the effect of zooming cannot be achieved.

Condition (4) specifies the focal length of the positive first lens group 10. By satisfying condition (4), the traveling distance of the positive first lens group 10 can be made shorter, and miniaturization of the zoom lens system can be attained.

If $f_T/f_{1G}$ exceeds the upper limit of condition (4), the power of the positive first lens group 10 becomes stronger, so that aberrations occurred in the positive first lens group 10 increases. Consequently, the correcting of aberrations becomes difficult.

If $f_T/f_{1G}$ exceeds the lower limit of condition (4), the power of the positive first lens group 10 becomes weaker, so that the traveling distance of the positive first lens group 10 becomes longer. As a result, miniaturization of the zoom lens system cannot be attained.

Conditions (5) and (6) relates to cemented lens elements in the case where the cemented lens elements are provided in the negative fourth lens group 40. By satisfying conditions (5) and (6), chromatic aberration can be adequately corrected.

If $f_T/f_{c4G}$ exceeds the upper limit of condition (5), the radius of curvature of the bonding surface of the cemented lens elements becomes smaller (the curvature sharpens), manufacture thereof becomes difficult. Furthermore, the divergence of the bonding surface becomes too strong, so that spherical aberration is over-corrected, and high-order aberrations occur.

If $f_T/f_{c4G}$ exceeds the lower limit of condition (5), the radius of curvature of the bonding surface of the cemented lens elements becomes larger (the curvature widens), the effect of the correcting of spherical aberration cannot be obtained.

If $v_{4P}-v_{4N}$ exceeds the lower limit of condition (6), it becomes difficult to perform chromatic correction adequately over the entire zooming range from the short focal length extremity to the long focal length extremity.

Conditions (7) and (8) relates to cemented lens elements in the case where the cemented lens elements are provided in the positive first lens group 10. By satisfying conditions (7) and (8), chromatic aberration can be adequately corrected.

If $f_T/f_{c1G}$ exceeds the upper limit of condition (7), the radius of curvature of the bonding surface of the cemented lens elements becomes smaller (the curvature sharpens), manufacture thereof becomes difficult. Furthermore, the divergence of the bonding surface becomes too strong, so that spherical aberration is over-corrected, and high-order aberrations occur.

If $f_T/f_{c1G}$ exceeds the lower limit of condition (7), the radius of curvature of the bonding surface of the cemented lens elements becomes larger (the curvature widens), the effect of the correcting of spherical aberration cannot be obtained.

If $v_{1P}-v_{1N}$ exceeds the lower limit of condition (8), it becomes difficult to perform chromatic correction adequately over the entire zooming range from the short focal length extremity to the long focal length extremity.

Condition (9) is for attaining a zoom ratio of 5.2 or more.

If $f_T/f_W$ exceeds the upper limit of condition (9), a zoom lens system having a zoom ratio of 5.2 or more cannot be achieved.

Condition (10) specifies at lease one aspherical surface in the case where the aspherical surface is provided in the positive third lens group 30. By employing an aspherical surface in the positive third lens group 30, the number of lens elements in the positive third lens group 30 can be reduced, and spherical aberration at the short focal length extremity in particular can be corrected.

If $\Delta I_{ASP}$ exceeds the upper limit of condition (10), the effect of the correcting of spherical aberration through the aspherical surface becomes smaller, so that sufficient correction cannot be performed.

If $\Delta I_{ASP}$ exceeds the lower limit of condition (10), the amount of asphericity becomes larger, so that manufacture of the lens element with the aspherical surface becomes difficult.

Condition (11) specifies at lease one aspherical surface in the case where the aspherical surface is provided in the negative fourth lens group 40. By employing an aspherical surface in the negative fourth lens group 40, the number of lens elements in the negative fourth lens group 40 can be reduced, and distortion at the short focal length extremity in particular can be corrected.

If $\Delta v_{ASP}$ exceeds the upper limit of condition (11), the amount of asphericity becomes larger, so that manufacture of the lens element with the aspherical surface becomes difficult.

If $\Delta v_{ASP}$ exceeds the lower limit of condition (11), the effect of the correcting of distortion through the aspherical surface becomes smaller, so that sufficient correction cannot be achieved.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, w designates the half angle-of-view (°), r designates the radius of curvature, d designates the lens-element thickness or distance between lens elements, $N_d$ designates the refractive index of the d-line, and $v_d$ designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Furthermore, the relationship between the aspherical coefficients and aberration coefficients is discussed as follows:

1. The shape of an aspherical surface is defined as follows:

$$x=cy^2/(1+[1\{1+K\}c^2y^2]^{1/2})+A4y^4+A6y^6+A8y^8+A10y^{10}\ldots$$

wherein:

x designates a distance from a tangent plane of an aspherical vertex;

y designates a distance from the optical axis;

c designates a curvature of the aspherical vertex (1/r),

K designates a conic constant;

2. In this equation, to obtain the aberration coefficients, the following substitution is made to replace K with "0" (Bi=Ai when K=0).

B4=A4+Kc$^3$/8;

B6=A6+(K$^2$+2K)c$^5$/16;

B8=A8+5(K$^3$+3K$^2$+3K)C$^7$/128

B10=A10+7(K$^4$+4K$^3$+6K$^2$+4K)c$^9$/256; and therefore, the following equation is obtained:

$$x=cy^2/[1+[1-c^2y^2]^{1/2}]+B4y^4+B6y^6+B8y^8+B10y^{10}+\ldots$$

3. Furthermore, in order to normalize the focal length f to 1.0, the followings are considered:

X=x/f; Y=y/f; C=f*c;

$\alpha 4=f^3B4$; $\alpha 6=f^5B6$; $\alpha 8=f^7B8$; $\alpha 10=f^9B10$

Accordingly, the following equation is obtained.

$$X=CY^2/[1+[1-C^2Y^2]^{1/2}]+\alpha 4Y^4+\alpha 6Y^6+\alpha 8Y^8+\alpha 10Y^{10}+\ldots$$

4. $\Phi=8(N'-N)\alpha 4$ is defined, and the third aberration coefficients are defined as follows:

I designates the spherical aberration coefficient;

II designates the coma coefficient;

III designates the astigmatism coefficient;

IV designates the curvature coefficient of the sagittal image surface; and

V designates a distortion coefficient; and therefore, the influence of the fourth-order aspherical-surface coefficient ($\alpha 4$) on each aberration coefficient is defined as:

$\Delta I=h^4\Phi$ $\Delta II=h^3k\Phi$ $\Delta III=h^2k^2\Phi$ $\Delta IV=h^2k^2\Phi$ $\Delta V=hk^3\Phi$ wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

[Embodiment 1]

FIG. 1 is the lens arrangement, at the short focal length extremity, of the zoom lens system according to the first embodiment of the present invention. FIGS. 2A through 2D show aberrations occurred in the lens arrangement shown in FIG. 1. FIG. 3A through 3D show aberrations occurred in the zoom lens system of the first embodiment at an intermediate focal length. FIGS. 4A through 4D show aberrations occurred in the zoom lens system of the first embodiment at the long focal length extremity. Table 1 shows the numerical data of the first embodiment.

Surface Nos. 1 through 5 designate the positive first lens group 10, surface Nos. 6 through 8 designate the negative second lens group 20, surface Nos. 9 through 11 designate the positive third lens group 30, and surface Nos. 12 through 16 designates the negative fourth lens group 40.

The positive first lens group 10 includes cemented lens elements having a negative lens element and a positive lens element, and a positive lens element, in this order from the object.

The negative second lens group 20 includes cemented lens elements having a negative lens element and a positive lens element, in this order from the object.

The positive third lens group 30 includes cemented lens elements having a negative lens element and a positive lens element, in this order from the object.

The negative fourth lens group 40 includes a positive lens element, and cemented lens elements having a negative lens element and a positive lens element, in this order from the object.

The diaphragm S is provided 1.00 mm behind the third lens group 30 (surface No. 11).

TABLE 1

FNO = 1:5.8–8.0–13.8
f = 39.00–90.00–216.00 (Zoom Ratio = 5.54)
W = 28.2–13.1–5.7
$f_B$ = 9.35–35.18–103.80
$f_{1G}$ = 76.26
$f_{4G}$ = 19.45
$f_{23W}$ = 31.70
$f_{23T}$ = 41.51

| Surface | r | d | $N_d$ | $v_d$ |
|---|---|---|---|---|
| 1 | −26.050 | 1.00 | 1.69912 | 34.2 |
| 2 | 100.000 | 2.63 | 1.84670 | 41.6 |
| 3 | −46.344 | 0.10 | — | — |
| 4 | 62.475 | 3.00 | 1.49700 | 81.6 |
| 5 | −47.854 | 2.50–13.15–17.46 | — | — |
| 6 | −30.848 | 1.20 | 1.83481 | 42.7 |
| 7 | 16.705 | 4.80 | 1.84666 | 23.8 |
| 8 | 94.817 | 4.67–1.50–0.67 | — | — |
| 9 | 13.544 | 1.40 | 1.84666 | 23.8 |
| 10 | 9.324 | 6.22 | 1.58636 | 60.9 |
| 11* | −29.980 | 13.37–7.01–2.70 | — | — |
| 12* | −110.471 | 2.80 | 1.58547 | 29.9 |
| 13 | −29.129 | 4.14 | — | — |
| 14 | −9.916 | 1.00 | 1.74038 | 53.2 |

TABLE 1-continued

FNO = 1:5.8–8.0–13.8
f = 39.00–90.00–216.00 (Zoom Ratio = 5.54)
W = 28.2–13.1–5.7
$f_B$ = 9.35–35.18–103.80
$f_{1G}$ = 76.26
$f_{4G}$ = 19.45
$f_{23W}$ = 31.70
$f_{23T}$ = 41.51

| Surface | r | d | $N_d$ | $v_d$ |
|---|---|---|---|---|
| 15 | 200.000 | 2.10 | 1.84666 | 24.3 |
| 16 | −234.464 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 11 | 0.00 | $0.65660 \times 10^{-4}$ | $0.12786 \times 10^{-7}$ | — |
| 12 | 0.00 | $0.78841 \times 10^{-4}$ | $0.16927 \times 10^{-6}$ | $0.28749 \times 10^{-8}$ |

[Embodiment 2]

FIG. 5 is the lens arrangement, at the short focal length extremity, of the zoom lens system according to the second embodiment of the present invention. FIGS. 6A through 6D show aberrations occurred in the lens arrangement shown in FIG. 5. FIGS. 7A through 7D show aberrations occurred in the zoom lens system of the first embodiment at an intermediate focal length. FIGS. 8A through 8D show aberrations occurred in the zoom lens system of the first embodiment at the long focal length extremity. Table 2 shows the numerical data of the second embodiment. The basic lens arrangement of the second embodiment is the same as the first embodiment. The diaphragm S is provided 1.00 mm behind the third lens group 30 (surface No. 11).

TABLE 2

FNO = 1:5.8–8.0–13.8
f = 39.01–90.00–220.00 (Zoom Ratio = 5.64)
W = 28.1–13.0–5.6
$f_B$ = 9.25–34.29–104.10
$f_{1G}$ = 74.80
$f_{4G}$ = −19.21
$f_{23W}$ = 31.92
$f_{23T}$ = 42.12

| Surface | r | d | $N_d$ | $v_d$ |
|---|---|---|---|---|
| 1 | −26.040 | 1.00 | 1.69984 | 33.4 |
| 2 | 100.000 | 2.66 | 1.84474 | 40.5 |
| 3 | −46.194 | 0.10 | — | — |
| 4 | 64.115 | 3.00 | 1.49700 | 81.6 |
| 5 | −45.870 | 2.50–12.95–17.46 | — | — |
| 6 | −29.652 | 1.20 | 1.83481 | 42.7 |
| 7 | 14.552 | 4.77 | 1.86000 | 25.3 |
| 8 | 91.330 | 4.68–1.30–0.68 | — | — |
| 9 | 13.572 | 1.40 | 1.84666 | 23.8 |
| 10 | 9.302 | 6.43 | 1.58636 | 60.9 |
| 11* | −29.451 | 13.55–7.38–2.87 | — | — |
| 12* | −123.419 | 2.80 | 1.58547 | 29.9 |
| 13 | −30.219 | 4.14 | — | — |
| 14 | −9.972 | 1.00 | 1.73511 | 53.7 |

TABLE 2-continued

FNO = 1:5.8–8.0–13.8
f = 39.01–90.00–220.00 (Zoom Ratio = 5.64)
W = 28.1–13.0–5.6
$f_B$ = 9.25–34.29–104.10
$f_{1G}$ = 74.80
$f_{4G}$ = −19.21
$f_{23W}$ = 31.92
$f_{23T}$ = 42.12

| Surface | r | d | $N_d$ | $v_d$ |
|---|---|---|---|---|
| 15 | 200.000 | 2.01 | 1.84666 | 23.8 |
| 16 | −363.920 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 11 | 0.00 | $0.67526 \times 10^{-4}$ | $0.26389 \times 10^{-8}$ | — |
| 12 | 0.00 | $0.78475 \times 10^{-4}$ | $0.18697 \times 10^{-6}$ | $0.32046 \times 10^{-8}$ |

[Embodiment 3]

Figure 13:
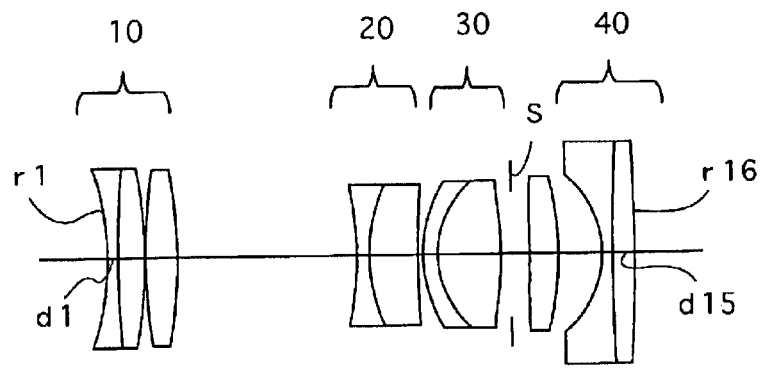
FIG. 13 is a lens arrangement, at the long focal length extremity, of the zoom lens system according to the third embodiment of the present invention.
Figures 14A, 14B, 14C, 14D:
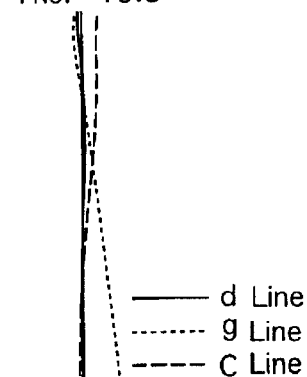
FIGS. 14A, 14B, 14C and 14D show aberrations occurred in the lens arrangement shown in FIG. 13.

FIG. 9 is the lens arrangement, at the short focal length extremity, of the zoom lens system according to the third embodiment of the present invention. FIGS. 10A through 10D show aberrations occurred in the lens arrangement shown in FIG. 9. FIGS. 11A through 11D show aberrations occurred in the zoom lens system of the third embodiment at a first intermediate focal length (before switching; fm=50.0) in the short-focal-length side zooming range Zw. FIGS. 12A through 12D show aberrations occurred in the zoom lens system of the third embodiment at a second intermediate focal length (after switching; fm'=120.0) in the long-focal-length side zooming range Zt. FIG. 13 is the lens arrangement, at the long focal length extremity, of the zoom lens system according to the third embodiment of the present invention. FIGS. 14A through 14D show aberrations occurred in the lens arrangement shown in FIG. 13. Table 3 shows the numerical data of the third embodiment. The fundamental lens arrangement of the third embodiment is the same as the first embodiment. The diaphragm S is provided 1.00 mm behind the third lens group 30 (surface No. 11).

TABLE 3

FNO = 1:5.8–7.2–11.5–13.8
f = 39.00–50.00–120.00–216.01 (Zoom Ratio = 5.54)
W = 28.2–22.8–10.0–5.7
$f_B$ = 9.36–16.99–50.48–103.45
$f_{1G}$ = 77.07
$f_{4G}$ = −19.47
$f_{23W}$ = 31.68
$f_{23T}$ = 42.16

| Surface | r | d | $N_d$ | $v_d$ |
|---|---|---|---|---|
| 1 | −26.647 | 1.00 | 1.72752 | 36.3 |
| 2 | 100.000 | 2.65 | 1.84670 | 44.4 |
| 3 | −45.428 | 0.10 | — | — |
| 4 | 59.163 | 3.00 | 1.49700 | 81.6 |
| 5 | −49.200 | 2.50–4.34–14.63–17.46 | — | — |
| 6 | −30.843 | 1.20 | 1.83481 | 42.7 |
| 7 | 16.085 | 4.80 | 1.85266 | 24.7 |
| 8 | 92.858 | 4.73—4.73–0.50—0.50 | — | — |

TABLE 3-continued

FNO = 1:5.8–7.2–11.5–13.8
f = 39.00–50.00–120.00–216.01 (Zoom Ratio = 5.54)
W = 28.2–22.8–10.0–5.7
$f_B$ = 9.36–16.99–50.48–103.45
$f_{1G}$ = 77.07
$f_{4G}$ = −19.47
$f_{23W}$ = 31.68
$f_{23T}$ = 42.16

| Surface | r | d | $N_d$ | $v_d$ |
|---|---|---|---|---|
| 9 | 13.505 | 1.40 | 1.84666 | 23.8 |
| 10 | 9.300 | 6.23 | 1.58636 | 60.9 |
| 11* | −30.250 | 13.27–10.44–5.55–2.72 | — | — |
| 12* | −114.325 | 2.80 | 1.58547 | 29.9 |
| 13 | −29.665 | 4.25 | — | — |
| 14 | −9.924 | 1.00 | 1.74422 | 52.1 |
| 15 | 200.000 | 2.14 | 1.84666 | 23.8 |
| 16 | −202.928 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 11 | 0.00 | $0.67049 \times 10^{-4}$ | $0.70405 \times 10^{-8}$ | — |
| 12 | 0.00 | $0.78100 \times 10^{-4}$ | $0.17716 \times 10^{-6}$ | $0.24679 \times 10^{-8}$ |

Table 4 shows the numerical values of each condition for each embodiment.

TABLE 4

|  | Embodiment 1 | Embodiment 2 | Embodiment 3 |
|---|---|---|---|
| (1) | −11.11 | −11.45 | −11.09 |
| (2) | 1.31 | 1.32 | 1.33 |
| (3) | 0.10 | 0.10 | 0.11 |
| (4) | 2.83 | 2.94 | 2.80 |
| (5) | 2.35 | 2.46 | 2.20 |
| (6) | 28.90 | 29.90 | 28.30 |
| (7) | 0.28 | 0.32 | 0.25 |
| (8) | 7.40 | 7.10 | 8.10 |
| (9) | 5.54 | 5.64 | 5.54 |
| (10) | −22.93 | −23.72 | −23.54 |
| (11) | 0.35 | 0.36 | 0.34 |

As can be understood from Table 4, the numerical values of the first through third embodiments satisfy conditions (1) through (11), and as can be understood from the drawings, the various aberrations can be adequately corrected.

According to the above description, a zoom lens system which has a four-lens-group arrangement, i.e., a positive lens group, a negative lens group, a positive lens group and a negative lens group in this order from the object, and has a zoom ratio of 5 or more, can be attained.

What is claimed is:

1. A zoom lens system comprising a positive first lens group, a negative second lens group, a positive third lens group, and a negative fourth lens group, in this order from an object, wherein zooming is performed by moving said positive first through negative fourth lens groups along the optical axis; and wherein said zoom lens system satisfies the following relationships:

$$-12 < f_T/f_{4G} < -10.5$$

$$0.05 < (d_{W12} - d_{T12})/f_W < 0.15$$

wherein $f_T$ designates the focal length of the entire zoom lens system at the long focal length extremity;

$f_{4G}$ designates the focal length of said negative fourth lens group;

$d_{W12}$ designates the distance between said positive first lens group and said negative second lens group at the short focal length extremity;

$d_{T12}$ designates the distance between said positive first lens group and said negative second lens group at the long focal length extremity; and $f_W$ designates the focal length of the entire zoom lens system at the short focal length extremity.

2. The zoom lens system according to claim 1, satisfying the following condition:

$$1.1 < f_{T23}/f_{W23} < 1.4$$

wherein $f_{T23}$ designates the combined focal length of said negative second lens group and said positive third lens group at the long focal length extremity; and $f_{W23}$ designates the combined focal length of said negative second lens group and said positive third lens group at the short focal length extremity.

3. The zoom lens system according to claim 1, satisfying the following condition:
$$2.5 < f_T/f_{1G} < 3.5$$

wherein $f_{1G}$ designates the focal length of said positive first lens group.

4. The zoom lens system according to claim 1, wherein said negative fourth lens group comprises cemented positive and negative lens elements; and wherein said cemented lens elements satisfy the following relationships:

$$2 < f_T/f_{c4G} < 4$$

$$15 < \nu_{4P} - \nu_{4N}$$

wherein $f_{c4G} = r_{c4G}/(n_{4P} - n_{4N})$;

$r_{c4G}$ designates the radius of curvature of the bonding surface of said cemented lens elements in said negative fourth lens group;

$n_{4P}$ designates the refractive index of said positive lens element of said cemented lens elements;

$n_{4N}$ designates the refractive index of said negative lens element of said cemented lens elements;

$\nu_{4P}$ designates the Abbe number of said positive lens element of said cemented lens; and $\nu_{4N}$ designates the Abbe number of said negative lens element of said cemented lens.

5. The zoom lens system according to claim 1, wherein said positive first lens group comprises cemented positive and negative lens elements; and wherein said cemented lens elements satisfy the following relationships:

$$0.2 < f_T/f_{c1G} < 0.4$$

$$5 < \nu_{1P} - \nu_{1N}$$

wherein $f_{c1G} = r_{c1G}/(n_{1P} - n_{1N})$;

$r_{c1G}$ designates the radius of curvature of the bonding surface of said cemented lens elements in said positive first lens group;

$n_{1P}$ designates the refractive index of said positive lens element of said cemented lens elements;

$n_{1N}$ designates the refractive index of said negative lens element of said cemented lens elements;

$\nu_{1P}$ designates the Abbe number of said positive lens element of said cemented lens elements; and $\nu_{1N}$ designates the Abbe number of said negative lens element of said cemented lens elements.

6. The zoom lens system according to claim 1, satisfying the following condition:

$$5.2 < f_T/f_W.$$

7. The zoom lens system according to claim 1, wherein said positive third lens group comprises a lens element having at least one aspherical surface; and wherein said aspherical surface satisfies the following condition:

$$-30 < \Delta I_{ASP} < -10$$

wherein $\Delta I_{ASP}$ designates the amount of change of the spherical aberration coefficient due to said aspherical surface in said positive third lens group under the condition that the focal length at the short focal length extremity is converted to 1.0.

8. The zoom lens system according to claim 1, wherein said negative fourth lens group comprises a lens element having at least one aspherical surface; and wherein said aspherical surface satisfies the following condition:

$$0 < \Delta V_{ASP} < 0.6$$

wherein $\Delta V_{ASP}$ designates the amount of change of the distortion coefficient due to said aspherical surface in said negative fourth lens group under the condition that the focal length at the short focal length extremity is converted to 1.0.

9. A zoom lens system comprising a positive first lens group, a negative second lens group, a positive third lens group, and a negative fourth lens group, in this order from an object, wherein zooming is performed by moving said positive first through negative fourth lens groups along the optical axis;

wherein said negative fourth lens group comprises positive and negative cemented lens elements; and wherein said zoom lens system satisfies the following relationships:

$$-12 < f_T/f_{4G} < -10.5$$

$$2 < f_T/f_{c4G} < 4$$

$$15 < \nu_{4P} - \nu_{4N}$$

wherein $f_T$ designates the focal length of the entire zoom lens system at the long focal length extremity;

$f_{4G}$ designates the focal length of said negative fourth lens group;

$f_{c4G} = r_{c4G}/(n_{4P} - n_{4N})$;

$r_{c4G}$ designates the radius of curvature of the bonding surface of said cemented lens elements in said negative fourth lens group;

$n_{4P}$ designates the refractive index of said positive lens element of said cemented lens elements;

$n_{4N}$ designates the refractive index of said negative lens element of said cemented lens elements;

$\nu_{4P}$ designates the Abbe number of said positive lens element of said cemented lens; and $\nu_{4N}$ designates the Abbe number of said negative lens element of said cemented lens.

10. A zoom lens system comprising a positive first lens group, a negative second lens group, a positive third lens group, and a negative fourth lens group, in this order from an object, wherein zooming is performed by moving said positive first through negative fourth lens groups along the optical axis;

wherein said positive first lens group comprises cemented positive and negative lens elements; and wherein said zoom lens system satisfies the following relationships:

$$-12 < f_T/f_{4G} < -10.5$$

$$0.2 < f_T/f_{c1G} < 0.4$$

$$5 < \nu_{1P} - \nu_{1N}$$

wherein $f_T$ designates the focal length of the entire zoom lens system at the long focal length extremity;

$f_{4G}$ designates the focal length of said negative fourth lens group, $f_{c1G} = r_{c1G}/(n_{1P} - n_{1N})$;

$r_{c1G}$ designates the radius of curvature of the bonding surface of said cemented lens elements in said positive first lens group;

$n_{1P}$ designates the refractive index of said positive lens element of said cemented lens elements;

$n_{1N}$ designates the refractive index of said negative lens element of said cemented lens elements;

$\nu_{1P}$ designates the Abbe number of said positive lens element of said cemented lens elements; and $\nu_{1N}$ designates the Abbe number of said negative lens element of said cemented lens elements.

11. A zoom lens system comprising a positive first lens group, a negative second lens group, a positive third lens group, and a negative fourth lens group, in this order from an object, wherein zooming is performed by moving said positive first through negative fourth lens groups along the optical axis; and wherein said zoom lens system satisfies the following relationship:

$$-12 < f_T/f_{4G} < -10.5$$

wherein $f_T$ designates the focal length of the entire zoom lens system at the long focal length extremity; and $f_{4G}$ designates the focal length of said negative fourth lens group, wherein said negative fourth lens group comprises a lens element having at least one aspherical surface; and wherein said aspherical surface satisfies the following relationship:

$$0 < \Delta V_{ASP} < 0.6$$

wherein $\Delta V_{ASP}$ designates the amount of change of the distortion coefficient due to said aspherical surface in said negative fourth lens group under the condition that the focal length at the short focal length extremity is converted to 1.0.

* * * * *